(12) United States Patent
Graf et al.

(10) Patent No.: US 6,181,171 B1
(45) Date of Patent: Jan. 30, 2001

(54) CIRCUIT CONFIGURATION FOR PULSED CURRENT REGULATION OF INDUCTIVE LOADS

(75) Inventors: Alfons Graf, Kaufering; Jenoe Tihanyi, Kirchheim, both of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/164,117

(22) Filed: Sep. 30, 1998

(30) Foreign Application Priority Data

Sep. 30, 1997 (DE) ............................................... 197 43 346

(51) Int. Cl.[7] ....................................................... H03B 1/00
(52) U.S. Cl. ........................... 327/110; 327/139; 327/538
(58) Field of Search .................................. 327/374, 423, 327/494, 538, 540, 541, 543, 110, 103, 139; 315/307, 223, 283

(56) References Cited

U.S. PATENT DOCUMENTS

| 5,612,610 | 3/1997 | Borghi et al. ......................... 323/222 |
| 5,925,989 | * 7/1999 | Blankers ............................... 315/307 |

FOREIGN PATENT DOCUMENTS 9105697    9/1991  (DE) .

* cited by examiner

*Primary Examiner*—Tuan T. Lam
*Assistant Examiner*—Hiep Nguyen
(74) *Attorney, Agent, or Firm*—Herbert L. Lerner; Laurence A. Greenberg; Werner H. Stemer

(57) ABSTRACT

A circuit configuration for pulsed current regulation of inductive loads includes a freewheeling configuration which is connected in parallel with the inductive load and has a current-measuring device in order to measure current exclusively while a switching device is in an open state. This avoids an otherwise customary shunt resistor and associated power loss.

9 Claims, 4 Drawing Sheets

CIRCUIT CONFIGURATION FOR PULSED CURRENT REGULATION OF INDUCTIVE LOADS

BACKGROUND OF THE INVENTION

Field of the Invention

The invention relates to a circuit configuration for pulsed current regulation of inductive loads, including a switching device connected in series with the inductive load between two supply-voltage terminals, and a measuring device for recording a signal corresponding to a current through the inductive load.

In order to provide for pulsed current regulation of inductive loads, as is customary, for example, for speed regulation of DC motors or for switched-mode power supplies, it is often necessary to measure the amplitude of the current through the inductive load and to use that measurement to set the duty ratio of the current regulation. An example of such pulsed current regulation has been described in German Utility Model G 91 05 697.7 U1, which is assigned to the assignee of the instant application. The switched-mode power supply described in that publication has a power MOSFET which is disposed in series with a primary winding of a transformer and has a so-called shunt resistor connected in series with it toward ground. A voltage drop across that resistor is recorded as a signal which is proportional to a load current through the power MOSFET, and is fed as a regulating signal to a control device driving the power MOSFET.

A problem when recording the current in that manner is the shunt resistor which is provided in series with the power switch, because that resistor causes power loss. However, such a shunt resistor or series resistor for the inductive load was heretofore the only possibility used to record the current in the inductive load. Besides the increased power loss of the circuit configuration, such a shunt resistor often also had to be provided as a separate component previously, which it was not possible to integrate.

SUMMARY OF THE INVENTION

It is accordingly an object of the invention to provide a circuit configuration for pulsed current regulation of inductive loads, which overcomes the hereinafore-mentioned disadvantages of the heretofore-known devices of this general type and in which current flowing through an inductive load can be recorded without any, or at least with reduced, power loss.

With the foregoing and other objects in view there is provided, in accordance with the invention, a circuit configuration for pulsed current regulation of inductive loads, comprising two supply-voltage terminals; a switching device connected in series with the inductive load between the supply-voltage terminals; a measuring device for recording a signal corresponding to a current through the inductive load; and a freewheeling configuration; the freewheeling configuration and the measuring device connected in parallel with the inductive load for measuring current while the switching device is in an open state.

When the switching device is switched on, the current in the inductive load is known to rise. In contrast, when the switching device has been switched off, that is to say when it is in its open state, the current in the freewheeling circuit can continue to flow. The current flowing in the freewheeling circuit when the switching device is switched off is detected in accordance with the invention. This freewheeling current is a measure of the current flowing through the inductive load in the switched-on state and can thus be evaluated for necessary regulating purposes.

The crucial advantage of such current measurement as compared with the otherwise customary shunt resistor is the virtually loss-free possibility of recording the current.

In accordance with another feature of the invention, the freewheeling configuration is produced by using a first diode connected in parallel with the inductive load. In order to record a current flowing through the inductive load, a second diode is connected in parallel with that diode. Cathode connections of the two diodes are connected to one another and are connected to one connection of the integrated load. Anode connections of the two diodes are connected to a different input of an operational amplifier in each case, and a signal which corresponds to the current to be measured is recorded by the measuring device at the output of this operational amplifier.

In accordance with a further feature of the invention, the input of the operational amplifier which is connected to the second diode is connected through a non-reactive resistor to the output of the operational amplifier.

In accordance with an added feature of the invention, the two diodes are produced as switched diodes, e.g. using a MOSFET. Expediently, the switching device is also a MOSFET in this case. The switching device and the switched diodes, that is the three MOSFETs in total, are driven by a driving device which is suitable for this purpose.

In accordance with a concomitant feature of the invention, the two diodes or switched diodes are monolithically integrated in a semiconductor body in order to ensure that the measurement is independent of temperature.

Other features which are considered as characteristic for the invention are set forth in the appended claims.

Although the invention is illustrated and described herein as embodied in a circuit configuration for pulsed current regulation of inductive loads, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
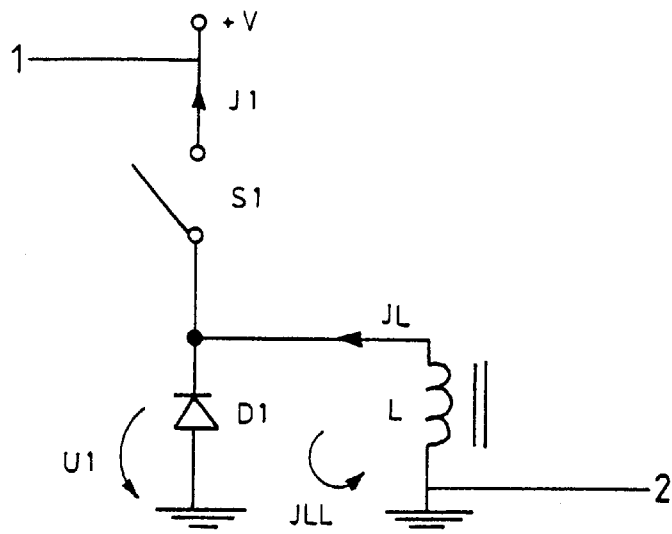
FIG. 1 is a basic schematic diagram of a circuit for the pulsed driving of an inductive load having a freewheeling path connected in parallel therewith.

Referring now to the figures of the drawings in detail and first, particularly, to FIG. 1 thereof, there is seen a basic circuit diagram of a half-bridge circuit having a freewheeling circuit. The circuit configuration has first and second supply-voltage terminals 1, 2. The first supply-voltage terminal 1 is connected to a positive potential +V, and the second supply-voltage terminal 2 is connected to reference-ground potential. A switching device S1 and an inductive load L are connected in series between the two supply-voltage terminals 1, 2. The inductive load L is connected to the supply-voltage terminal 2 and therefore has one connection connected to reference-ground potential. A diode D1 is connected in parallel with the inductive load L as a free-wheeling diode. For this purpose, a cathode connection of the diode D1 is connected to a junction point of the inductive load L and the switching device S1. An anode connection of the diode D1 is connected to reference-ground potential.

Figure 2:
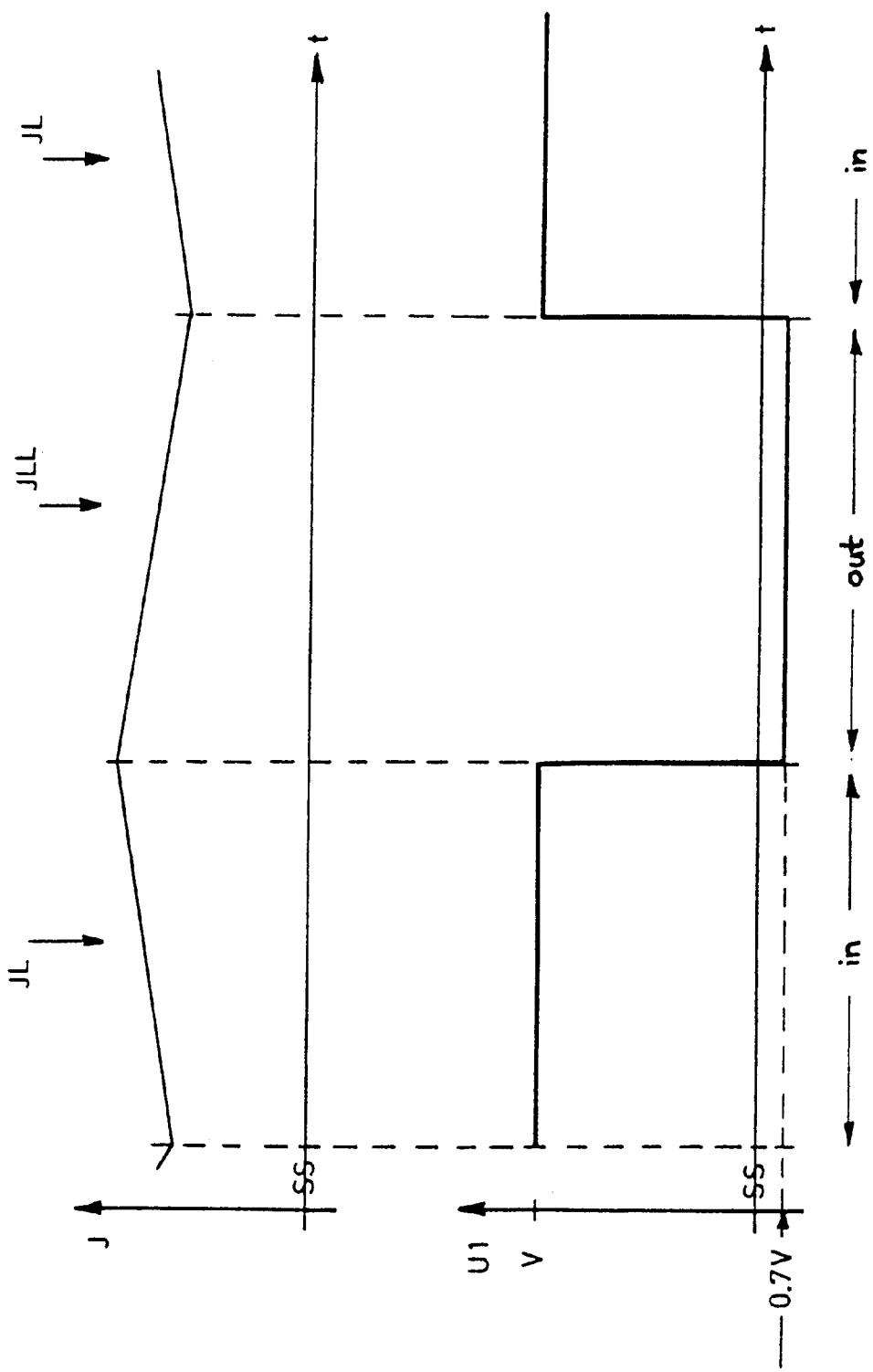
FIG. 2 is a graph showing current and voltage waveforms for the circuit configuration of FIG. 1.

As can be seen from the signal waveforms of FIG. 2, a current IL flows through the inductive load L when the switching device S1 is switched on and off. This current flow IL rises slowly from a specified value during the switched-on phases of the switching device S1 and then falls again gently as a current flow ILL during the switched-off phases, that is to say while the switching device S1 is in the open state. If the switching device S1 is closed again, the process is repeated and the current I rises again gently until the switching device S1 is switched off.

The current flow during the switched-off phases of the switching device S1 is ensured by the freewheeling produced by the diode D1. This is because, when the switching device S1 is turned off, the current stored by the inductive load L can flow away to reference-ground potential through the diode D1. During the switched-on phases of the switching device S1, there is a voltage drop U1 across the diode D1. That voltage drop is roughly equal to the supply-voltage potential +V. On the other hand, when the switching device S1 is turned off, the voltage drop across the diode D1 is roughly 0.7 volt.

Figure 3:
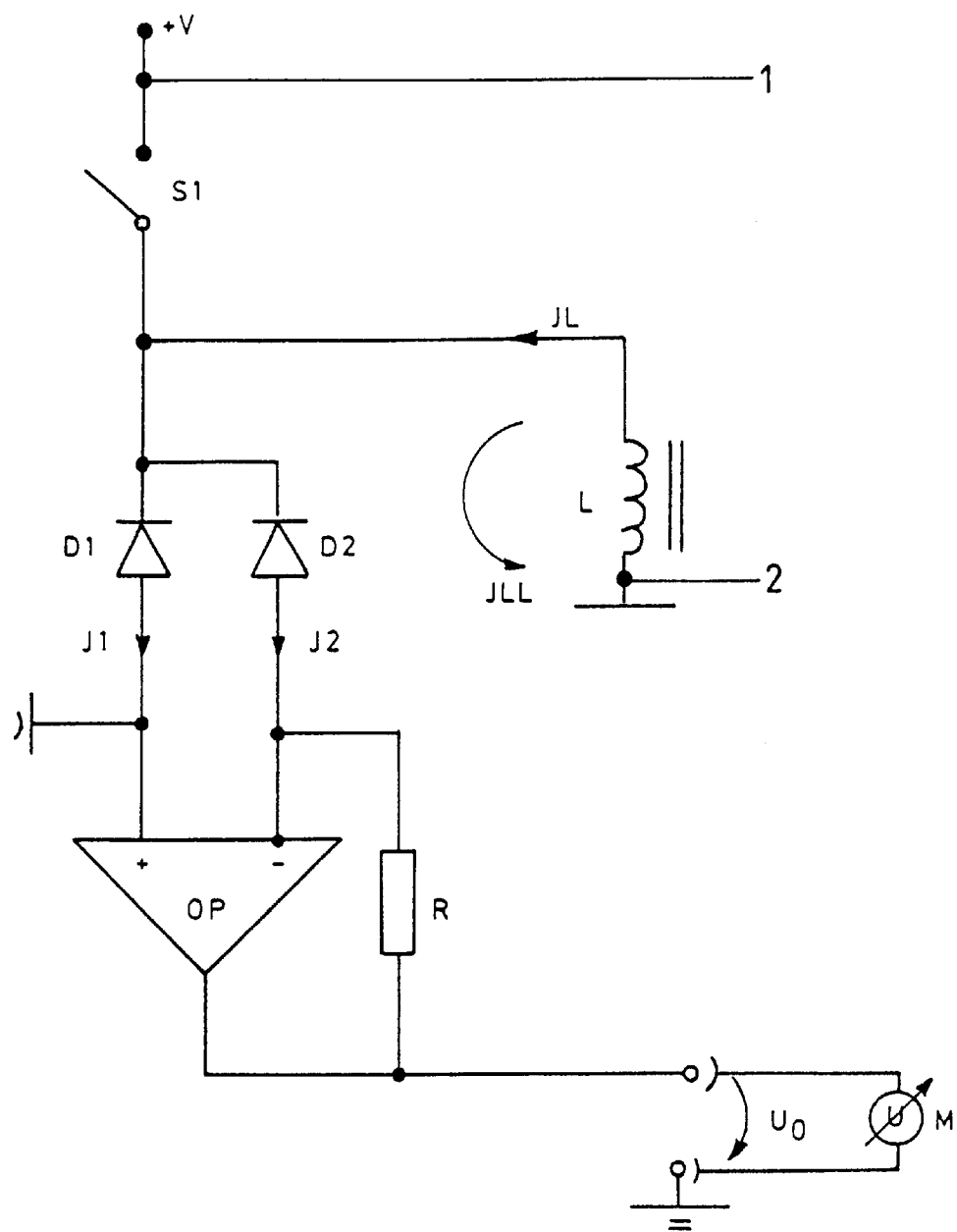
FIG. 3 is a diagram showing a first exemplary embodiment of a circuit configuration having a current-measuring circuit according to the invention.

For example, the current may be recorded during the open states of the switching device S1 in the following manner:

In the first embodiment of FIG. 3, a second diode D2 is connected in parallel with the first diode D1. A cathode connection of this second diode D2 is connected to the cathode connection of the diode D1 and is thus likewise connected to the junction point of the switching device S1 and the inductive load L. The anode connection of the diode D1 is connected to a noninverting input of an operational amplifier OP, and an anode connection of the diode D2 is connected to an inverting input of the operational amplifier OP. The inverting input of the operational amplifier OP is additionally connected through a non-reactive resistor R to an output of the operational amplifier OP. A measuring device M can be connected to the output of the operational amplifier OP. The measuring device M records the voltage at the output of the operational amplifier OP with respect to the reference-ground potential. A voltage signal obtained at the output of the operational amplifier OP is a measure of the current flowing through the inductive load L and can therefore be used for regulating purposes for pulsed driving of the switching device S1.

The diode D2 has smaller dimensions than the diode D1, that is to say the effective diode area of the diode D2 is constructed to be smaller than the effective diode area of the diode D1. If enough current is forced through this second diode D2 to make the anode voltage of the diode D2 0 volts as well, the following relationship is produced:

$$I1/I2 = A_{D1}/A_{D2},$$

where I1 is the current flowing through the diode D1, and I2 is the current flowing through the diode D2. $A_{D1}$ is the effective diode area of the diode D1, and $A_{D2}$ is the effective diode area of the diode D2.

Furthermore, the following relationship also applies:

$$U_0 = R*I2 = R*I1*A_{D2}/A_{D1}.$$

The diodes D1 and D2 are preferably monolithically integrated in a common semiconductor body in order to ensure the above-mentioned proportionality of the currents I1/I2 independently of temperature.

Figure 4:
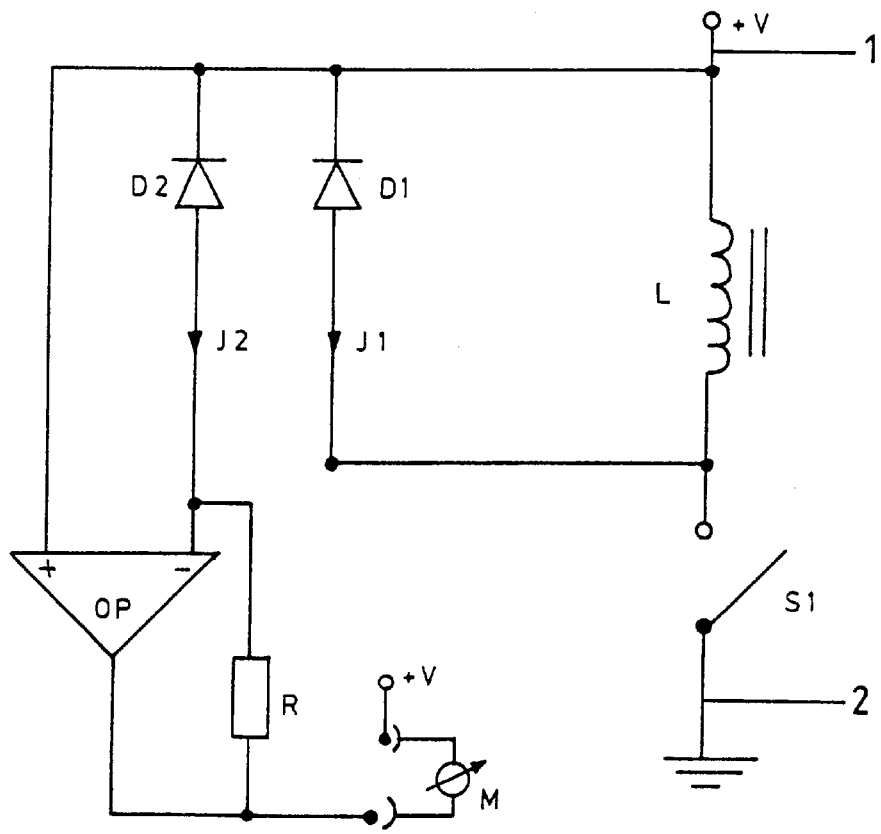
FIG. 4 is a diagram showing a second exemplary embodiment of a circuit configuration according to the invention having a current-measuring circuit.

FIG. 4 shows a second exemplary embodiment of a circuit configuration according to the invention. In contrast to the circuit configuration of FIG. 3, one terminal of the inductive load L is connected directly to the supply-voltage terminal 1, and therefore to a positive potential +V. The other terminal of the inductive load L is connected through the switching device S1 to reference-ground potential and therefore to the supply-voltage terminal 2. The anode connection of the diode D1 is connected to the junction point of the switching device S1 and the inductive load L. The cathode connections of the two diodes D1 and D2 are connected on one hand to the supply-voltage terminal 1 and on the other hand to the noninverting input of the operational amplifier OP. As in FIG. 3, the anode connection of the diode D2 is connected to the inverting input of the operational amplifier OP and to one connection of the non-reactive resistor R. The other connection of the non-reactive resistor R is in turn connected to the output of the operational amplifier OP. The measuring device M is provided for measuring the voltage difference existing between the supply-voltage terminal 1 and the output of the operational amplifier OP.

Figures 5, 5A:
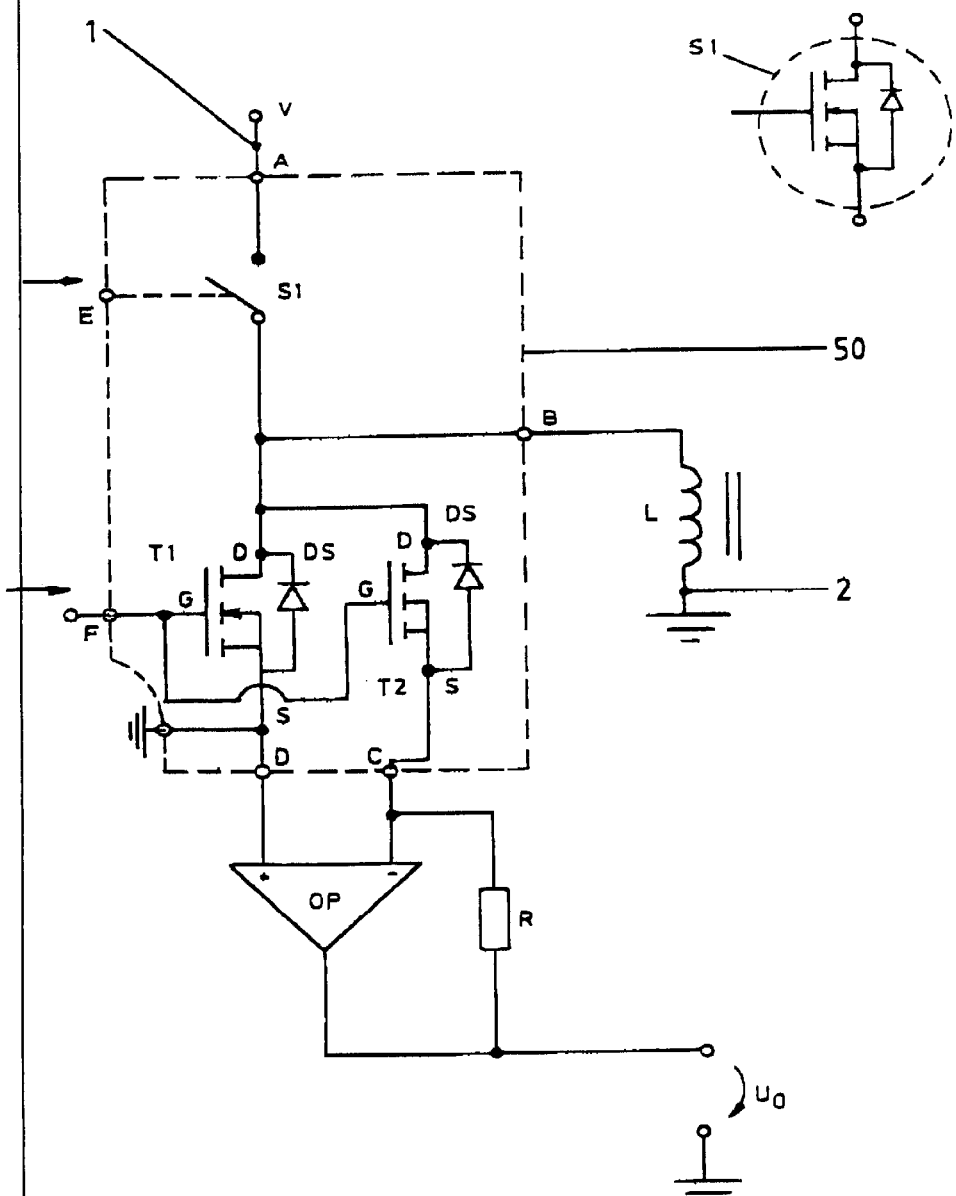
FIG. 5 is a diagram showing a third exemplary embodiment of a circuit configuration having a current-measuring circuit according to the invention.
FIG. 5a is diagram showing a MOSFET as an embodiment of a switching device of FIG. 5.

FIG. 5 shows a third exemplary embodiment. The diodes D1, D2 explained in conjunction with FIGS. 3 and 4 are replaced by switched diodes, in such a way that two MOSFETs T1, T2 are provided. Drain connections D of the two MOSFETs T1, T2 are connected to the switching device S1. A source connection S of the MOSFET T1 is connected to the noninverting input of the operational amplifier OP, and a source connection of the MOSFET T2 is connected to the inverting input of the operational amplifier OP. Drain-source paths of the two MOSFETs T1, T2 are each bridged by a respective protective diode DS. Gate connections G of the two MOSFETs T1, T2 are connected to one another and are connected to a driving device, which is not shown in FIG. 5 for the sake of better clarity. The driving device ensures that the MOSFETs T1, T2 are switched on when the switching device S1 is in the switched-off state, in order to guarantee freewheeling of the current flowing beforehand through the inductive load L.

As is indicated in FIG. 5a, the switching device S1 can likewise be a MOSFET.

Dashed lines in FIG. 5 show the possibility of integrating the MOSFET forming the switching device S1 and the two MOSFETs T1, T2 in a common semiconductor body as an integrated circuit 50. Such an integrated circuit 50 must have connection terminals A, B, C, D, E and F which are accessible from outside. This is done in order, firstly, to ensure that the switching device S1 and the MOSFETs T1, T2 can be driven through the terminals E and F, and, secondly, to provide possibilities for connecting the inductive load L and the operational amplifier OP.

A ratio of currents through the MOSFETs T1, T2 is equal to a ratio of cell numbers $N_{T1}/N_{T2}$, that is to say $$I1/I2 = N_{T1}/N_{T2}.$$

We claim:

1. In a circuit configuration for pulsed current regulation of inductive loads, the improvement comprising:

two supply-voltage terminals;

a switching device connected in series with the inductive load between said supply-voltage terminals;

a measuring device for recording a signal while said switching device is in an open state corresponding to a current through the inductive load;

a first diode connected in parallel with the inductive load;

an operational amplifier having a non-inverting input terminal, an inverting input terminal, and an output;

a second diode;

said first diode and said second diode having cathode connections connected to one another and to one terminal of the inductive load;

said first diode having an anode connection connected to said non-inverting input terminal of said operational amplifier;

said second diode having an anode connection connected to said inverting input terminal of said operational amplifier; and said measuring device connected to said output of said operational amplifier for recording a signal corresponding to a current flowing through the inductive load.

2. The circuit configuration according to claim 1, including a non-reactive resistor connected between said output of said operational amplifier and said inverting input terminal of said operational amplifier to which said second diode is connected.

3. The circuit configuration according to claim 1, wherein said diodes have effective diode areas, and said effective diode area of said second diode is smaller than said effective diode area of said first diode.

4. The circuit configuration according to claim 1, wherein said diodes are switched diodes having transistors.

5. The circuit configuration according to claim 1, wherein:

one of said supply-voltage terminals is to be connected to a positive supply potential, the other of said supply-voltage terminals is to be connected to reference-ground potential; and the inductive load has one terminal connected to said other supply-voltage terminal and another terminal connected through said switching device to the one supply-voltage terminal.

6. The circuit configuration according to claim 1, wherein:

one of said supply-voltage terminals is to be connected to a positive supply potential, the other of said supply-voltage terminals is to be connected to reference-ground potential; and the inductive load has one terminal connected to said one supply-voltage terminal and another terminal connected through said switching device to said other supply-voltage terminal.

7. The circuit configuration according to claim 1, wherein said switching device is a power semiconductor switch.

8. The circuit configuration according to claim 1, wherein said switching device is a power MOSFET.

9. The circuit configuration according to claim 1, wherein said switching device and said diodes are integrated in a common semiconductor body as an integrated circuit.

* * * * *